United States Patent [19]

Dunwoody

[11] Patent Number: 5,197,285
[45] Date of Patent: Mar. 30, 1993

[54] MODULAR DIGITAL ACTUATOR

[75] Inventor: Andrew B. Dunwoody, Richmond, Canada

[73] Assignee: The University of British Columbia, Vancouver, Canada

[21] Appl. No.: 756,332

[22] Filed: Sep. 6, 1991

Related U.S. Application Data

[63] Continuation-in-part of Ser. No. 585,524, Sep. 20, 1990, Pat. No. 5,062,268, and a continuation-in-part of Ser. No. 632,944, Dec. 24, 1990, Pat. No. 5,058,384, which is a continuation of Ser. No. 473,748, Feb. 2, 1990, Pat. No. 5,011,180.

[51] Int. Cl.$^5$ ............................................. B60T 11/20
[52] U.S. Cl. ..................................... 60/562; 60/567; 60/581; 60/591; 92/110; 91/224; 91/226; 91/234; 91/235; 91/397
[58] Field of Search ................... 91/224, 226, 234, 235, 91/397; 92/110; 60/562, 567, 581, 591

[56] References Cited

U.S. PATENT DOCUMENTS

| | | | |
|---|---|---|---|
| 1,142,551 | 6/1915 | Burnhart | 91/226 |
| 1,499,569 | 1/1924 | Bailly | 91/234 X |
| 2,727,467 | 12/1955 | Russell | 91/224 X |
| 2,862,478 | 12/1958 | Staats | 91/226 X |
| 3,407,601 | 10/1968 | Beck | 60/567 X |
| 3,603,207 | 9/1971 | Parrett | 92/110 X |
| 4,505,115 | 3/1985 | Arbuckle | 60/562 |
| 4,602,481 | 7/1986 | Robinson . | |
| 4,922,719 | 5/1990 | Arbuckle | 92/110 X |
| 5,063,828 | 11/1991 | Kamimura | 92/110 X |

FOREIGN PATENT DOCUMENTS

| | | | |
|---|---|---|---|
| 1298752 | 7/1967 | Fed. Rep. of Germany | 91/224 |
| 3836103 | 4/1990 | Fed. Rep. of Germany . | |

OTHER PUBLICATIONS

Graphic Symbols for Fluid Power Diagrams, pp. 7 and 12, The ASME, 1973.

Primary Examiner—Edward K. Look
Assistant Examiner—Todd Mattingly
Attorney, Agent, or Firm—C. A. Rowley

[57] ABSTRACT

A modular digital actuator is formed by interconnecting a plurality of modules. Each of the modules includes a housing having a pair of different sized axially extending cylinder sections in which is received a T-shaped piston with the top of the T mating with the larger cylinder and the leg of the T forming a piston in the smaller cylinder. The leg of the T is hollow and forms a cylinder to receive an axially extending piston forming shaft to thereby provide three preferably different sized cooperating piston and cylinder areas, one formed in the cavity or hollows of the leg of the T, a second formed between the top of the T surrounding the leg of the T and the junction between the larger cylinder section and smaller cylinder section and the third formed in the smaller cylinder section between a closed free end of the smaller cylinder section and the leg of the T surrounding the piston forming shaft. The top of the T forms a piston wall in a fourth hydraulic cavity. Several of these modules may be interconnected by positioning same in axial relationship with the end closure of the smaller cylinder of the second module forming an end closure for the larger cylinder of the first module and the large cylinder in the first module on the top side of the T connected to the cavity forming cylinder of the second module via a passage through the piston forming shaft of the second module. The areas of the different pistons and cylinders formed in the second module may be different from those in the first module.

4 Claims, 2 Drawing Sheets

MODULAR DIGITAL ACTUATOR

CROSS-REFERENCE TO RELATED APPLICATIONS

This application is a continuation in part of U.S. application Ser. Nos. 07/585,524 now U.S. Pat. No. 5,062,268 and 07/632,944 now U.S. Pat. No. 5,058,384 filed Sept. 20, 1990 and Dec. 24, 1990 respectively and which are continuations in part of U.S. application Ser. No. 07/473,748 filed Feb. 2, 1990 now U.S. Pat. No. 5,011,180 issued Apr. 30, 1991.

FIELD OF THE INVENTION

The present invention relates to a digital actuator. More particularly the present invention relates to a modular digital actuator.

BACKGROUND OF THE PRESENT INVENTION

The concept of digital actuators is known, however generally such actuators are relatively complicated to machine and cannot easily be manufactured. Further, it is difficult to change the capacity of any one such actuator since normally all of the pistons and cylinders used to provide the digital action are incorporated in a single housing.

U.S. Pat. No. 4,602,481 issued Jul. 29, 1986 to Robinson discloses a linear double acting digital system and German Offenlegungsschriftde 3836103 A1 to Damler-Benz Aktiengesellschaft discloses an axially operable multi-piston and cavity arrangement for forming a digital actuator.

BRIEF DESCRIPTION OF THE PRESENT INVENTION

It is an object of the present invention to provide a modular system for producing a digital actuator.

Broadly the present invention relates to a module for use in a digital actuator said module comprising a housing having a pair of axially extending cylinder forming sections, a first section of said pair of sections having a first cross sectional and a second section of said pair of said sections having a second cross sectional area, said first cross sectional area being larger than said second cross sectional area, piston means forming a first piston in said first section, an extension on said piston means, said extension mating with said second cylinder section to form a second piston rigidly connected with said first piston and axially slidable in said second section, an axially extending cavity in said extension, said cavity forming a cylinder extending axially of said housing, a shaft forming a third piston extending axially of said housing and axially slidable in said cavity, an end closure closing the end of said second section remote from said first section, said third piston being connected to said end closure, an axial passage extending through said end closure and said shaft and leading into said cavity, a first passage through said housing leading into said first cylinder section adjacent to a line of demarcation between said first and second sections in said housing and a second passage passing through said housing leading into said second section adjacent to said end closure.

Preferably a plurality of said modules will be axially positioned so that said end closure of a second module closes the end of said second cylinder forming section said second module and said first cylinder forming section of a first module and said axial passage in said second module interconnecting the end of said first cylinder section remote from said second cylinder section in said first module with said cavity in said second module.

Preferably at least one of said first cross sectional areas and second cross sectional areas and said cavity in said first module will have a different cross sectional area than its corresponding first cross sectional area, second cross sectional area or cavity in said second module.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENT

Figure 1:
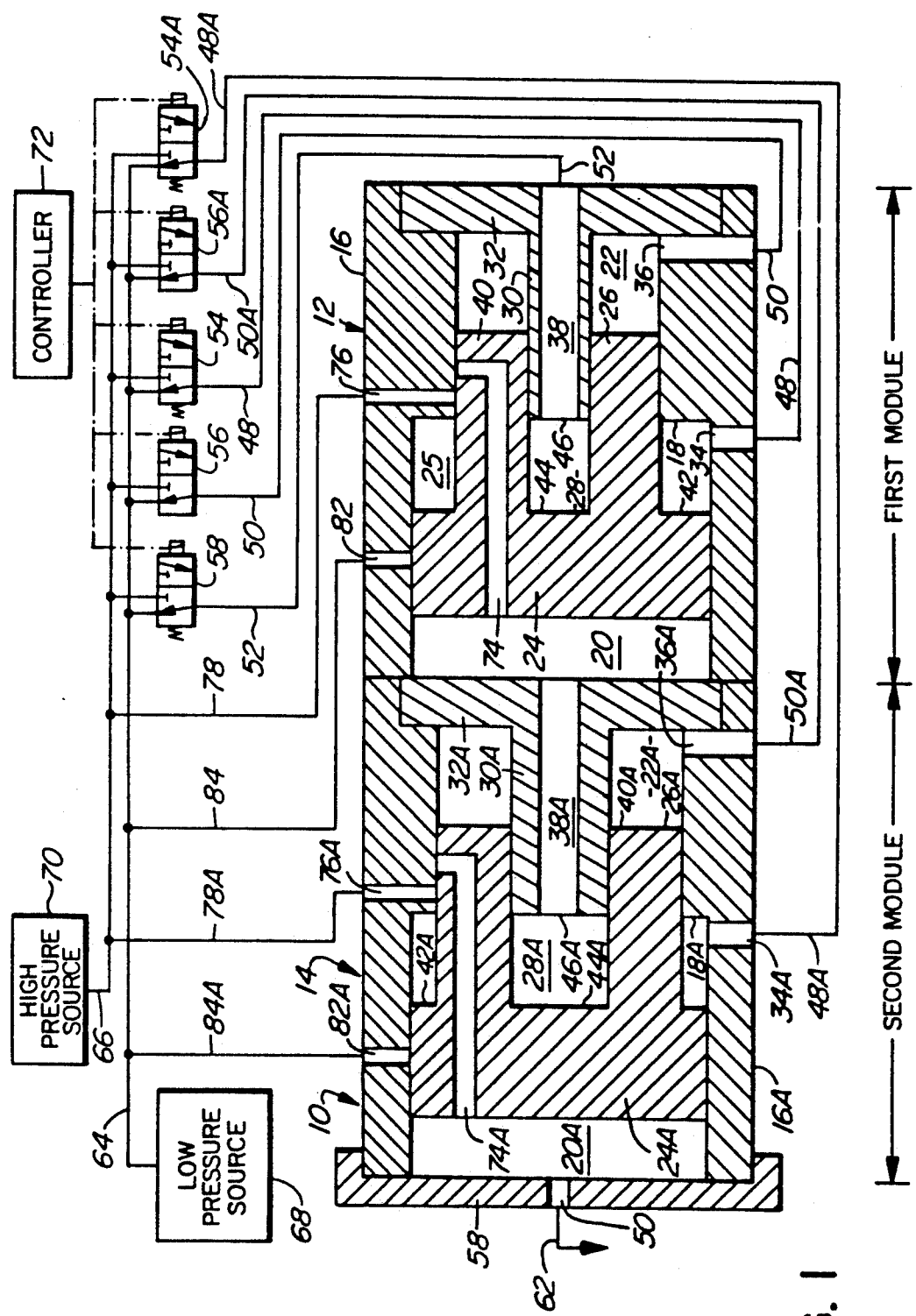
FIG. 1 is a schematic cross section of a modular digital actuator constructed in accordance with the present invention and incorporating a pair of different modules.

As shown FIG. 1, digital actuator 10 is formed by a pair of modules 12 and 14 each of which is similarly constructed but may have piston of different cross sectional areas thus the description of module 12 will also be applicable to module 14 and like reference numerals have been used to indicate like parts of the two modules, but with the corresponding parts in the second module 14 followed by the letter A.

Each module is formed by housings 16 and where the modules are to be assembled in end to end relation it is preferable to make the outside cross section of the housing 16 of each of the modules substantially the same.

The housings 16 are divided at a line of demarkation 18 into a first cylinder forming section or cavity 20 and a second cylinder forming section or cavity 22. A piston 24 is received in the larger cylinder section 20 to form a large area piston on one side thereof and a smaller area piston on the opposite side thereof received in the cavity 25 and is provided on the opposite side thereof with an extension 26 that forms a piston within the second cylinder section 22. The piston 24 and extension 26 are integrally interconnected so that movement of one causes movement of the other.

The extension 26 has a cavity 28 that extends substantially axially thereof and receives a shaft forming piston 30 which is connected to an end closure 32 that closes the end of the housing 16 and thus the end of the small cylinder forming section 22 remote from the larger cylinder forming section 20.

A first hydraulic flow passage 34 extends through the housing 16 into the section 20 adjacent to the line of demarcation 18 between the cavities 20 and 22, a second hydraulic passage 36 extends through the housing 16 and enters the section 22 at a position adjacent to the end closure 32 and an axial passage 38 extends through the shaft forming piston 30 and end closure 32 into the cavity 28.

It will be apparent that the passage 36 permits the ingress and egress of hydraulic fluid into a cylinder on the outside of the piston 30 and between the end closure 32 and the end wall 40 of the extension 26. The passage 34 on the other hand communicates with cylinder formed outside of the extension 26 and permits the development of a hydraulic pressure between the line of demarkation or area of demarkation 18 and the corresponding surface 42 on the first piston 24, i.e. the portion of the piston 24 extended beyond the extension 26. The passage 38 permits communication with the cavity 28 and thus adjusts the pressure between the wall 44 of the piston 24 and the end 46 of the piston 30.

Each of the passages 34, 36 and 38 are connected via hydraulic lines 48, 50 and 52 to their respective control valves 54, 56 and 58 respectively. However the passage 38A in the second module 14 does not have a corresponding line to line 52 since the passage 38A connects directly with the cylinder 20 and transmits the hydraulic pressure within the cylinder 20 into the cavity 28A to thereby couple the two modules together.

The end of the second module 14 remote from the first module 12 is covered via a cap 58 having a fitting 60 through which hydraulic fluid from the chamber 20A may be withdrawn and directed as indicated by the arrow 62 to actuate any selected hydraulic mechanism.

In the above description only two modules 12 and 14 have been illustrated, however the cap 58 may be removed and further module(s) similar to the module 14 or 12 may be applied in place of the cap 58 and the cap 58 is applied to the final module assembly in the same manner as illustrated to the modules 14.

Each of the valves 54, 56 and 58 are connected via lines 64 and 66 selectively to a source of hydraulic fluid at low pressure, i.e. a reservoir 68 or to a higher pressure source 70 respectively. Each of the valves 54, 56 and 58 are controlled by a controller 72 so that cylinder sections 20, 22, and 28 can be selectively, individually connected either to the high pressure source 70 or the low pressure source 68 via the controller 72.

Preferably the areas of the pistons sections 40, 42 and 44 will be different and will be in a selected sequence. In the illustrated arrangement the area 44 has been indicated as having an area of 1, the area 42 having an area of 2 which is twice 1 and the area 44 having an area of 4 which is twice the area 2.

In the illustrated arrangement the area 44A has been designated as area 1, the area 42A is equivalent to the area 44A and the area 40A is twice the area 44A or 42A.

Provision has been made should the pistons 24 or 24A be over extended in one direction or the other. In the event say the piston 24 extends too far to the left in FIG. 1 then the passage 74 will connect with the passage 76 which is connected via line 78 to connect the high pressure 70 to the cavity 20 to apply high pressure on the full surface area of the piston 24 and force same to the right. Alternatively if the piston 24 moves too far to the right the passage 82 communicates with the section 22 to the left of the piston 24 so that the cavity 20 may be connected via line 84 to the low pressure source 68.

Figure 2:
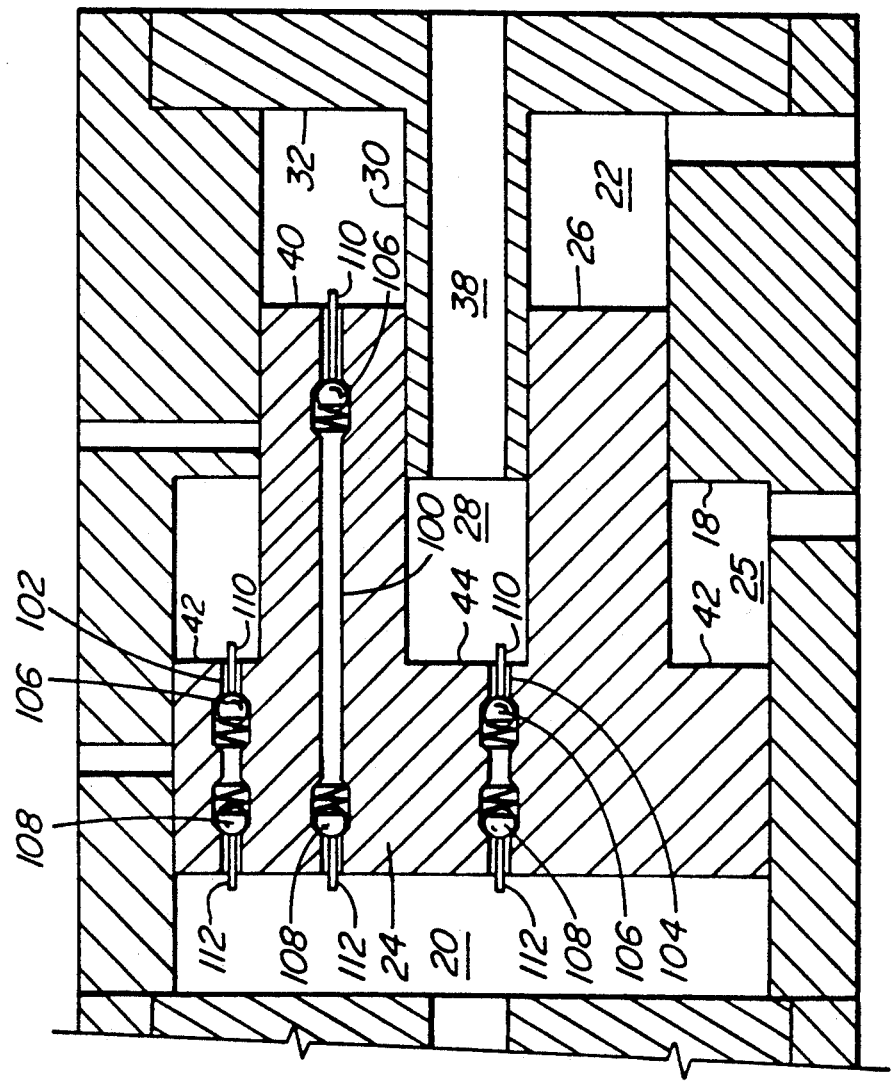
FIG. 2 shows a section through a module illustrating an alternative system for preventing overextension of the T shaped piston in either direction.

An alternative system for preventing overextension of the T shaped piston 24 in either direction is shown in FIG. 2 As shown the cylinder 20 is interconnected with the cylinder sections or cavities 22, 28, and 25 respectively by axial passages 100, 102 and 104. Each of the passages 100, 102 and 104 has a pair of oppositely biased check valves 106 and 108 which prevent flow through the passages 100, 102 or 104 until the extensions 110 (from the balls 106 or the extensions 112 from the balls 108 are forced by contact with an end wall of the cylinder into which they project move the balls 106 or 108 respectively from their seats. Normally there is no flow through any pair of check valves 106 and 108 in any one of the passages 100, 102 or 104 because one or the other would oppose flow. When the piston 24, 26 approaches one end of its travel, the rods 106 or 108 depending on the direction of travel will open their respective balls 106 or 108. The flow direction in all cases moves the piston 24, 26 toward the centre of travel. The three check valve pairs are used because at least one of the cavities 22, 28, 25 must have a higher pressure than the cavity 20 if the piston 24 is to approach the end cap 32A or a pressure less than the cavity 20 if the piston 24, 26 approaches the cap 32.

Having described the invention modifications will be evident to those skilled in the art without departing from the spirit of the invention as defined in the appended claims.

I claim:

1. A module for use in a digital actuator, said module comprising a housing having a pair of axially extending cylinder forming sections, a first section of said pair of sections having a first cross sectional area and a second section of said pair of said sections having a second cross sectional area, said first cross sectional area being different from said second cross sectional area, piston means, said piston means forming a first piston axially slidable in and mating with said first section, said piston means also including an extension, said extension forming a second piston rigidly connected with said first piston and axially slidable in and mating with said second section, an axially extending cavity in said piston means, said cavity forming a cylinder extending axially of said housing, a shaft forming a third piston extending axially of said housing and axially slidable in and mating with said cavity, an end closure closing the end of said second section remote from said first section, said third piston being connected to said end closure, an axial passage for fluid flow to and from said cavity extending through said end closure and said shaft and leading into said cavity, a first passage through said housing leading into said first section adjacent to a line of demarkation between said first and second sections in said housing for flow of fluid therethrough to and from said first section and a second passage through said housing leading into said second section adjacent to said end closure for flow of fluid to and from said second section, a plurality of said modules axially positioned so that said end closure of a second module closes the end of said second cylinder forming section of said second module and said first cylinder forming section of a first module and said axial passage in said second module interconnects the end of said first cylinder section remote from said second cylinder section in said first module with said cavity in said second module.

2. A module as defined in claim 1 wherein at least one of said first cross sectional areas and second cross sectional areas and said cavity in said first module will have a different cross sectional area than its corresponding first cross sectional area, second cross sectional area or cavity in said second module.

3. A module as defined in claim 1 further comprising axial communicating passages through said piston means interconnecting said cylinder sections on opposite sides of said piston means, a pair of valves in each of said communicating passages one of each of said pair of valves preventing flow through its respective said communicating passages in one direction and the other valve of each said pair of valves preventing flow in the other direction through its respective said passage and means for moving one of said pair of valves to open same when said piston means moves too far in one direction and a second means to move the other valve of said pair of valves when said piston means is moved too far in the opposite direction to said one direction.

4. A module as defined in claim 2 further comprising axial communicating passages through said piston and said piston means interconnecting said cylinder sections on opposite sides of said piston means, a pair of valves in each of said communicating passages one of each of said pair of valves preventing flow through its respective said communicating passages in one direction and the other valve of each said pair of valves preventing flow in the other direction through its respective said passage and means for moving one of said pair of valves to open same when said piston means moves too far in one direction and a second means to move the other valve said pair of valves when said piston means is moved too far in the opposite direction to said one direction.

* * * * *